United States Patent [19]

Ikenoya et al.

[11] Patent Number: 4,727,717

[45] Date of Patent: Mar. 1, 1988

[54] EXHAUST GAS CLEANING SYSTEM FOR MULTI-CYLINDER INTERNAL COMBUSTION ENGINES

[75] Inventors: Yasuo Ikenoya, Kawagoe; Makoto Hirano; Masafumi Araki, both of Asaka, all of Japan

[73] Assignee: Honda Giken Kogyo Kabushiki Kaisha, Tokyo, Japan

[21] Appl. No.: 326,909

[22] Filed: Dec. 2, 1981

[30] Foreign Application Priority Data

Dec. 3, 1980 [JP] Japan .................. 55-170698

[51] Int. Cl.4 ............................. F01N 3/30
[52] U.S. Cl. .................. 60/293; 60/305; 180/219; 180/291
[58] Field of Search .............. 60/293, 305, 274; 180/219, 291

[56] References Cited

U.S. PATENT DOCUMENTS 3,906,722 9/1975 Garcea .................. 60/293
4,154,058 5/1979 Mase .................. 60/293

FOREIGN PATENT DOCUMENTS 32947 3/1980 Japan .................. 60/293
146224 11/1980 Japan .................. 60/293

Primary Examiner—Douglas Hart
Attorney, Agent, or Firm—Roberts, Spiecens & Cohen

[57] ABSTRACT

An improved exhaust gas cleaning system for a multi-cylinder internal combustion engine having an exhaust system with exhaust ports opening into a plurality of combustion chambers. A secondary air supplying system is in communication with the exhaust system for supplying secondary air to the exhaust system. A plurality of reed valve devices are interposed in the secondary air supplying system and are operated to open and close in response to pulsations of exhaust gas developed in the exhaust system during engine operation for controlling supply of secondary air to the respective exhaust ports independently of each other.

18 Claims, 6 Drawing Figures

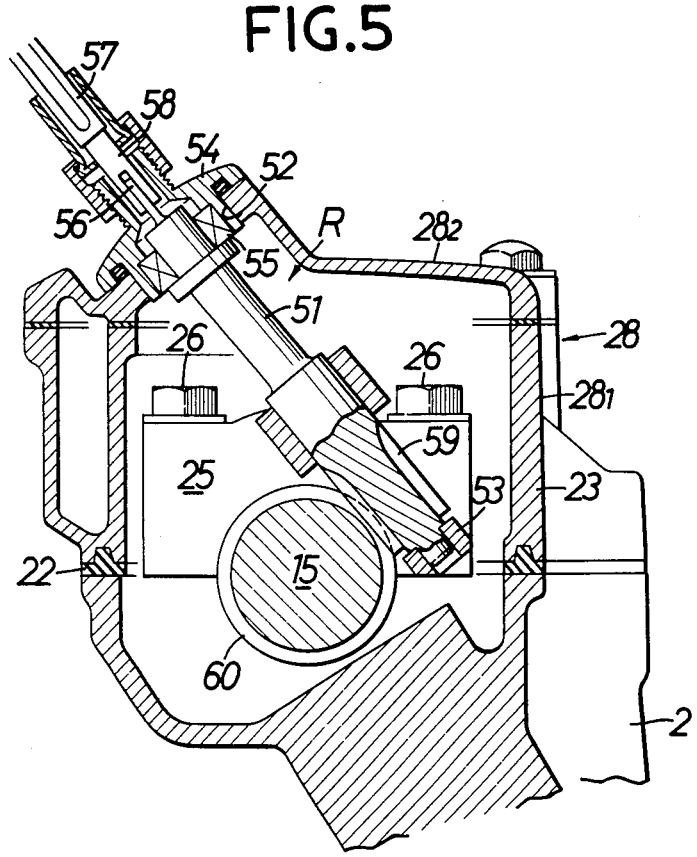

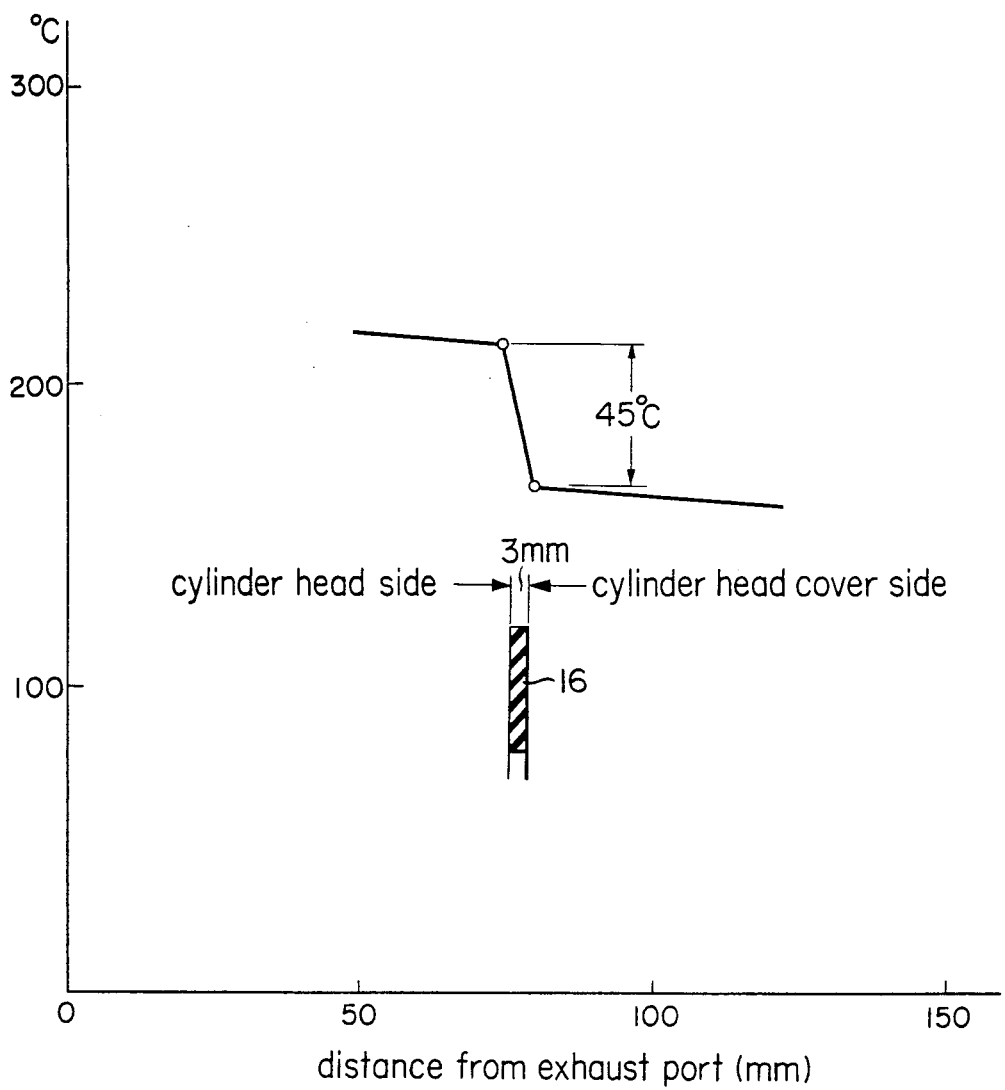

EXHAUST GAS CLEANING SYSTEM FOR MULTI-CYLINDER INTERNAL COMBUSTION ENGINES

BACKGROUND OF THE INVENTION

1. Field of the Invention

The present invention relates to an exhaust gas cleaning system for internal combustion engines, adapted to supply secondary air uniformly to the exhaust ports of cylinders of the engine to effectively oxidize and remove unburnt noxious components in the exhaust gas.

2. Description of the Prior Art

Such an exhaust gas cleaning system for multi-cylinder internal combustion engines has been known as having secondary air supply passages leading to the exhaust ports of cylinders and a reed valve device disposed in the secondary air supply system. The reed valve device is adapted to be opened by the pulsation of the exhaust gas pressure to permit the introduction of the secondary air to the exhaust ports.

This known system, however, has the following disadvantages. Namely, the supply of the secondary air to the exhaust ports is made non-uniformly or, in the worst case, some of the exhaust ports cannot receive sufficient secondary air, because of differences in the flow resistance in the secondary air passages due to differences in length and diameter of the passages, as well as mutual interference of the pulsating exhaust pressures between the exhaust ports. This problem becomes serious particularly when the number of the cylinders is increased.

SUMMARY OF THE INVENTION

Accordingly, an object of the invention is to provide an exhaust gas cleaning system for multi-cylinder internal combustion engines, capable of overcoming the above-described problems of the prior art.

To this end, according to the invention, there is provided an exhaust gas cleaning system for multi-cylinder internal combustion engines, comprising a plurality of reed valve devices for respective exhaust ports, disposed in the secondary air supply system connected to the exhaust system of a multi-cylinder internal combustion engine, the reed valve device being capable of supplying the seocndary air to each exhaust port independently of one another.

This arrangement is effective in eliminating the mutual interference of pulsating exhaust pressures from different exhaust ports which open at different timings. In addition, it becomes possible to render uniform the lengths of secondary air supply passages between the reed valve devices and the exhaust ports, which in turn permits the secondary air to be supplied to the exhaust ports uniformly and stably at the optimum rate.

Each of the independent reed valve devices can have a reduced size and the noise generated by the operation of each reed valve device is not transmitted to other reed valve devices. Thus, the level of the noise produced by the secondary air supply system as a whole can be reduced to an acceptable level.

Another object of the invention is to provide an exhaust gas cleaning system for multi-cylinder internal combustion engines which can by mounted conveniently in the dead space of the engine without incurring an increase of the height of the engine, and which can operate stably and reliably for a long period of time due to a superior cooling effect which eliminates any overheating of the system.

Still another object of the invention is to provide an exhaust gas cleaning system for multi-cylinder engines which can be mounted without hindering the maintenance operations such as adjustment of the tappet clearance, replacement of the spark plugs, etc.

A further object of the invention is to provide an exhaust gas cleaning system for multi-cylinder internal combustion engines in which the portion of the secondary air supply passages formed in the engine body can be processed easily and only a small portion of the secondary air supply passages is exposed to the outside of the engine body, the system having a simple construction with a reduced number of parts and being easy to assemble.

A still further object of the invention is to provide an exhaust gas cleaning system for multi-cylinder internal combustion engines provided with an engine r.p.m. pick-up devise to permit a reduction of the number of parts and to simplify the construction, thereby to improve the assembling characteristics.

The above and other objects, features and advantages of the invention will become apparent from the following description of a preferred embodiment when taken in conjunction with the accompanying drawings.

BRIEF DESCRIPTION OF THE DRAWINGS

FIG. 5 is a sectional view taken along line V—V in FIG. 4; and

FIG. 6 is a graph showing the excellent heat insulating effects according to the invention.

DESCRIPTION OF THE PREFERRED EMBODIMENT

A preferred embodiment of the invention applied to a six cylinder engine for a motorcycles will be described hereinunder with reference to the accompanying drawings.

Figure 1:
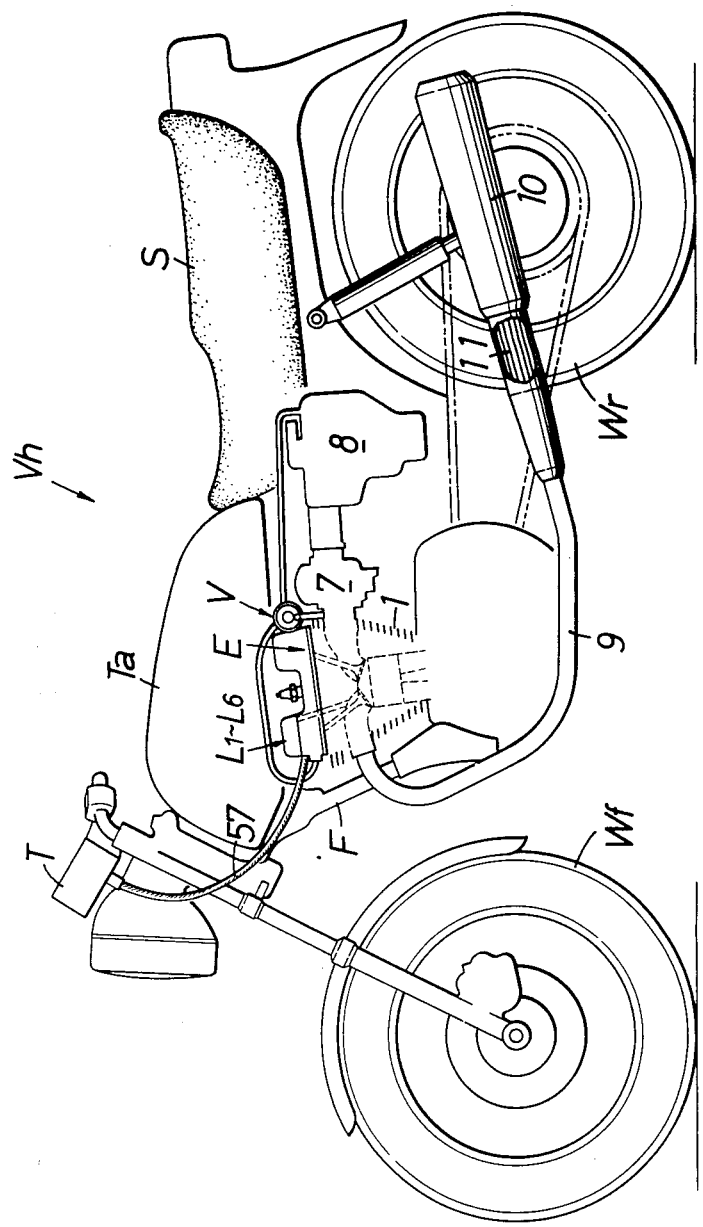
FIG. 1 is a side elevational view of a motorcycle having an internal combustion engine provided with an exhaust gas cleaning system in accordance with an embodiment of the invention.

Referring first to FIG. 1 therein is seen, a motorcycle Vh which has a frame F on which are mounted a fuel tank Ta and a seat S. Front and rear wheels Wf and Wr are carried by front and rear end portions of the frame. An internal combustion engine E having 6 (six) cylinders arranged in series is suspended frm the frame Fr between the front and rear wheels Wf,Wr. The engine E is adapted to drive the rear wheel Wr. The cylinders of the engine E is so arranged that the crank shaft thereof extends perpendicularly to the longitudinal axis of the frame Fr.

Figure 2:
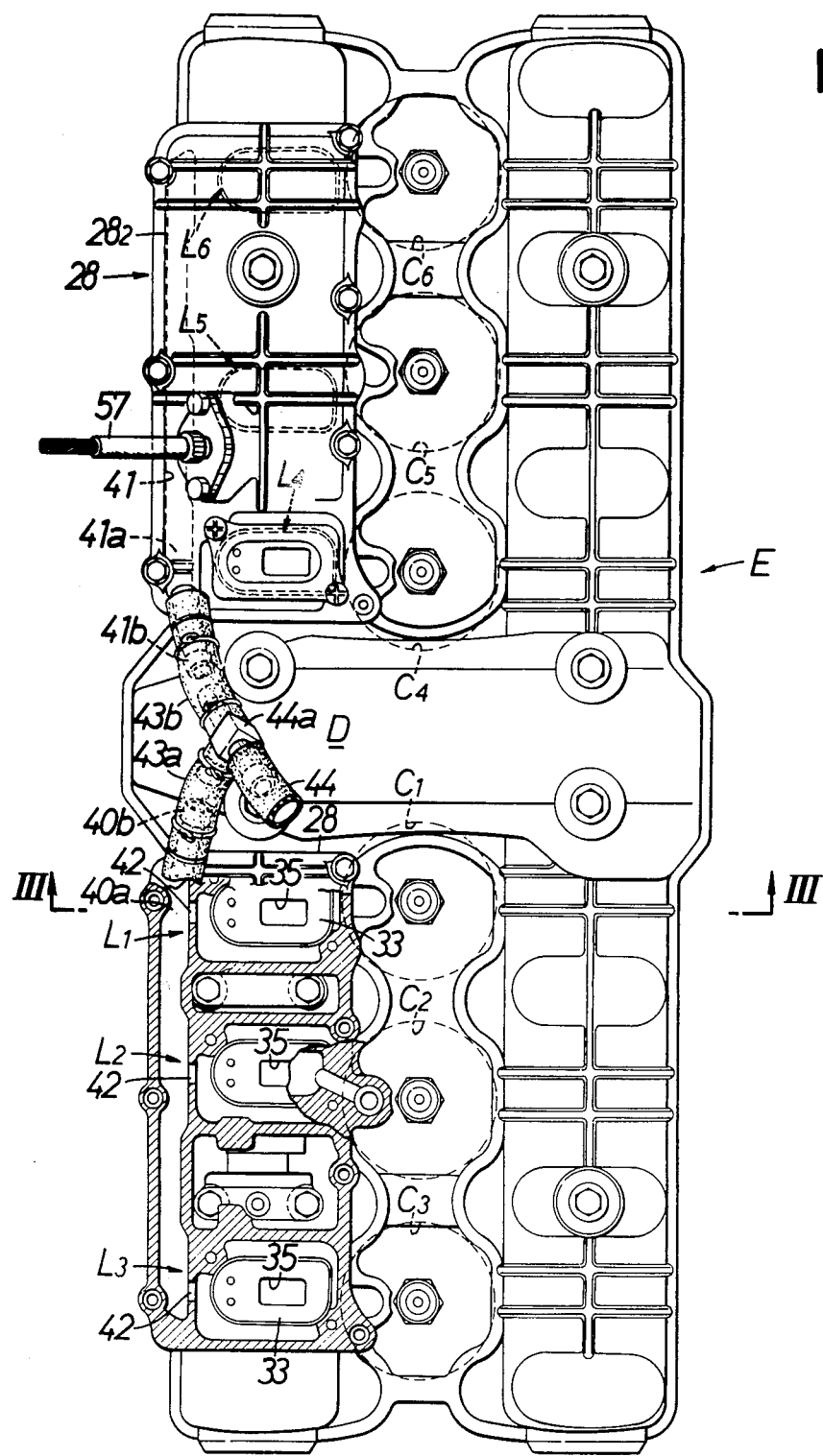
FIG. 2 is a plan view, partly in section, of the motorcycle as shown in FIG. 1.
Figure 3:
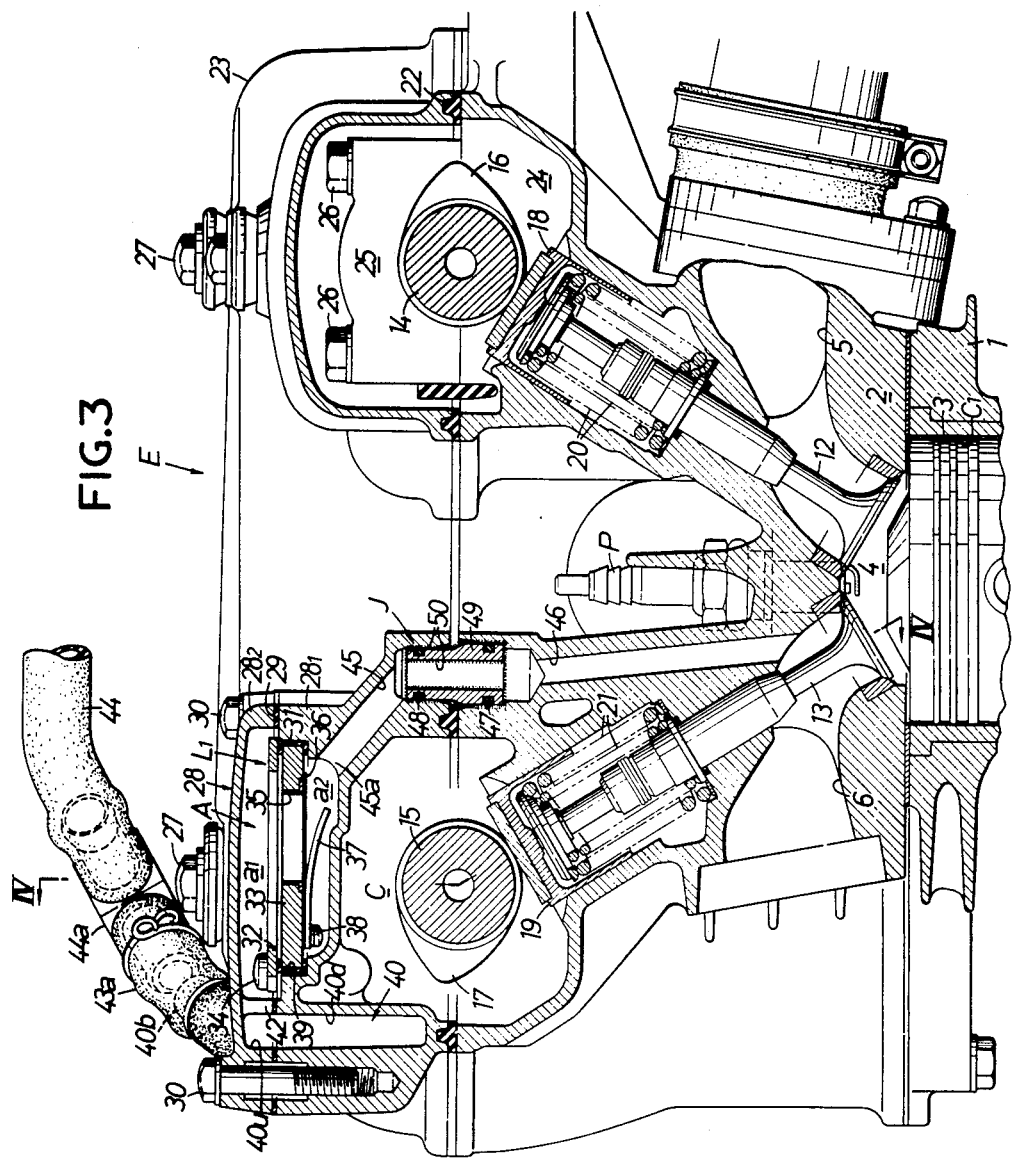
FIG. 3 is a sectional view taken along line III—III in FIG. 2.

Referring now to FIGS. 2 and 3, the cylinders of the engine E are divided into two groups: a first group including the cylinders $C_1, C_2, C_3$ and a second group including cylinders $C_4, C_5, C_6$. These two groups of cylinders are arranged in series across a central cam shaft driving section D, so as to form a cylinder block 1. A cylinder head 2 is placed on and fixed to the top of the cylinder block 1. The cylinder head 2 forms combustion chambers 4 above respective pistons 3.

Intake ports 5 communicating with the combustion chambers 4 are disposed at the rear side of the cylinder head 2, while, at the front side of the cylinder head are, disposed exhaust ports 6 communicating with respective combustion chambers 4.

The intake ports 5 open at the rear of the engine E, while the exhaust ports 6 open at the front of the engine E.

An intake system including a carburetor 7, air cleaner 8 and so forth disposed at the rear of the engine E is connected to the intake ports 5, while an exhaust system including exhaust pipes 9, mufflers 10 and so forth is connected to the exhaust ports 6. A catalytic converter 11 for cleaning the exhaust gas is disposed in an intermediate portion of a muffler 10.

As will be clearly seen from FIG. 3, the cylinder head 2 carries intake valves 12 and exhaust valves 13 arranged in pairs in a V-like form, for opening and closing respective intake ports 5 and exhaust ports 6. Cam shafts 14,15 are arranged above the intake and exhaust valves 12,13. Valve actuating cams 16,17 integral with the cam shafts 14,15 are in contact with tappets 18,19 on the intake and exhaust valves 12,13. As well known to those skilled in the art, the intake and exhaust valves 12,13 are opened and closed at suitable timings by the cooperation of the rotation of the valve actuating cams 16,17 and the action of valve springs 20,21.

Although not shown, the central cam shaft transmission section D of the engine E accomodates a chain drive mechanism for transmitting the power for the crank shaft of the engine to the cam shafts 14,15. A plug P is screwed into each portion of the cylinder head between the intake valve 12 and the exhaust valve 13 of each cylinder.

A cylinder head cover 23 is attached to the upper portion of the cylinder head 2 through the medium of a heat insulating elastic packing 22 such as a heat insulating rubber seal having a thickness of 2-3 mm. The cam shafts 14, 15 are rotatably mounted between the cylinder head 2 and the cylinder head cover 23.

The construction for supporting the cam shafts 14, 15 will be described hereinunder with reference mainly to FIGS. 3 and 4.

In the upper portion of the cylinder head 2, are formed a plurality of bearings, 24 having semi-circular recesses. These recesses are arrayed in the axial direction of the cam shafts 14, 15. Cam shaft holders, 25 having complementary semi-circular recesses are secured by means of pairs of bolts, 26. The cam shafts 14, 15 are held rotatably between the bearings 24 and the cam shaft holders 25.

Bolts, 27 are passed through the cylinder head cover 23 and are screwed to every other cam shaft holder, 25 thereby to fix the cylinder head covers 23 onto the cylinder head 2.

Figure 4:
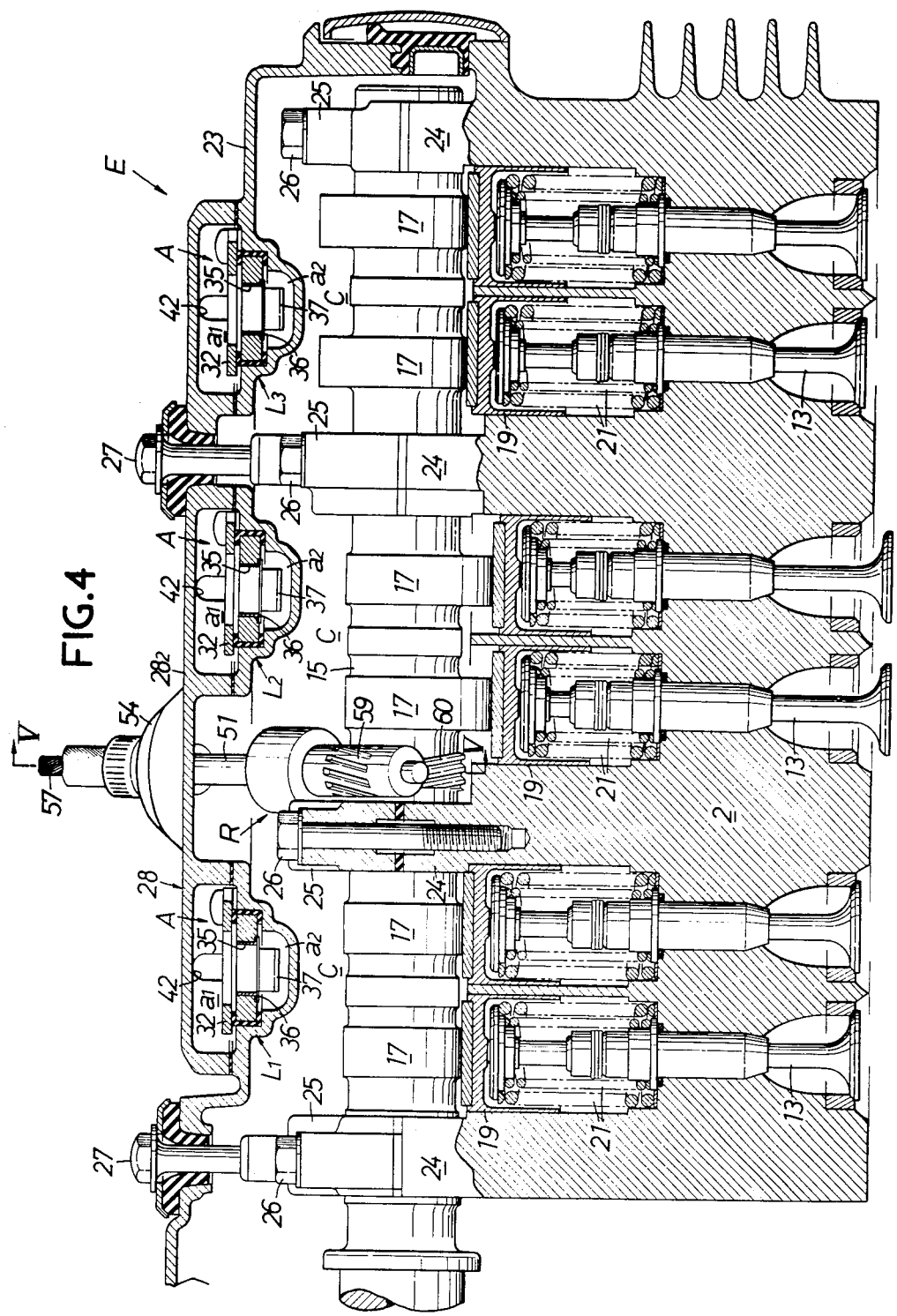
FIG. 4 is a sectional view taken along line IV—IV in FIG. 3.
Figure 2:
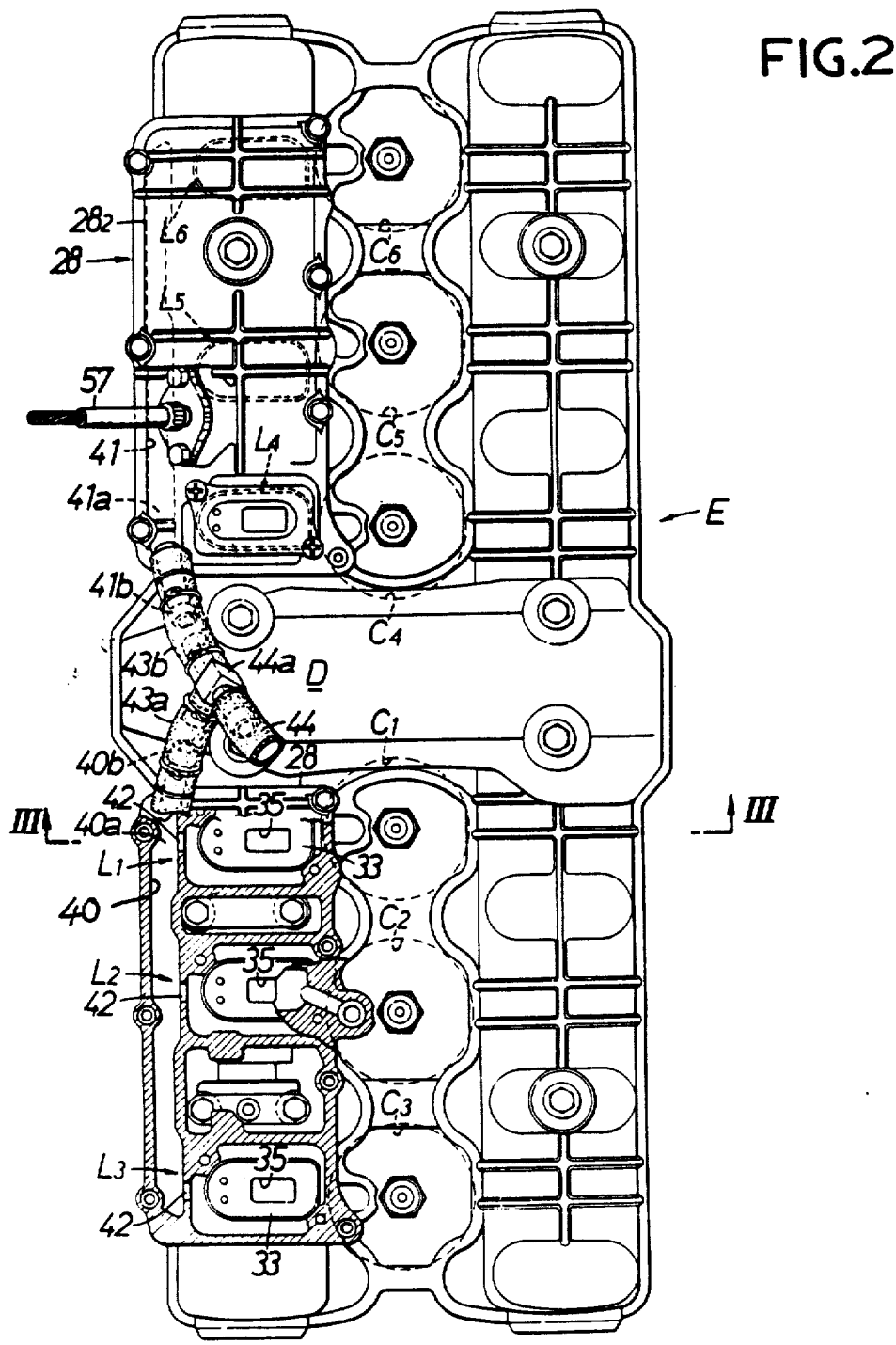

As will be seen from FIGS. 3 and 4, in a space C formed between adjacent cam shaft holders, 25 above one of the cam shafts 15, are disposed two groups of reed valve devices $L_1,L_2,L_3$ and $L_4,L_5,L_6$ corresponding to the two groups of cylinders $C_1,C_2,C_3$ and $C_4,C_5,C_6$, and adapted to operate in response to the pulsation of the exhaust gas pressure. These reed valve devices are disposed in the axial direction of the cam shafts. The reed valve devices $L_1,L_2,L_3$ and $L_4,L_5,L_6$ take the same position to one another in relation to the associated cylinders $C_1,C_2,C_3$ and $C_4,C_5,C_6$.

On the top surface of the cylinder head cover 23, left and right valve housings, $28_1$ are disposed at the left and right sides of the central cam shaft driving portion D. Attached to the top surface of each valve housing $28_1$ is a valve cover $28_2$ by means of a plurality of fixing bolts 30 through the medium of a packing 29. The left and right valve housings $28_1$, and the left and right valve covers, $28_2$ in combination form left and right valve boxes 28,28.

The aforementioned two groups of reed valve devices $L_1,L_2,L_3$ and $L_4,L_5,L_6$ of exhaust gas pressure responsive types are arranged in alignment within the left and right valve casings, 28.

The reed valve devices $L_1,L_2,L_3$ and $L_4,L_5,L_6$ have an identical construction. The construction of the reed valve device $L_1$ will be described by way of example with reference to FIG. 3. A reed valve chamber A is formed in the valve casing 28. Within the reed valve chamber A, a recess 39 is formed in the top surface of the valve housing $28_1$. The recess 39 receives a reed valve member 33 through a medium of a heat-resistant packing 31 having a channel cross-section. The reed valve member 33 is fixed to the valve housing $28_1$ through an attaching plate 32 by means of a fixing screw 34.

The space in the reed valve chamber A is divided into an upstream chamber $a_1$ and a downstream chamber $a_2$ by means of the reed valve member 33. The upstream and downstream chambers $a_1$ and $a_2$ communicate with each other through a valve port 35 formed in the reed valve member 33. The upstream chamber $a_1$ is made to have a planar area greater than the planar projection area of the reed valve member 33, so that a sufficiently large capacity is obtained even though the height is reduced. The reed valve member 33 is provided on its face opposite the downstream chamber $a_2$ with a reed 36 for opening and closing the valve port 35 and a reed stopper 37 adapted to limit the opening of the reed 36. The reed 36 and the reed stopper 37 are superposed and fixed to the reed valve member 33 by means of a stopper screw 38.

As will be seen from FIG. 2, at the left and right sides of the front face of the cylinder head cover 23, are formed a left and right inlet passages 40,41 along the two groups of cylinders $C_1,C_2,C_3$ and, $C_4,C_5,C_6$. The inlet passages 40,41 are provided with inlet openings $40a,41a$ formed in the vicinity of the central cam shaft transmission section D in symmetry with each other. The inlet openings $40a,41a$ are connected by means of connecting pipes $40b,41b$ to one of the ends of connecting tubes $43a,43b$ disposed at the front central portion of the cylinder head cover 23. The other ends of the connecting tubes $43a,43b$ are connected to a secondary air introduction tube 44 through a connecting pipe $44a$. The secondary air introduction tube 44 is connected to air cleaning chamber of an air cleaner 8, through an air control valve V (FIG. 1) disposed at an intermediate portion of the secondary air introduction tube 44. The air control valve V is known per se, and adapted to open and close the passage in response to the intake vacuum in the intake system, during the operation of the internal combustion engine.

The left and right secondary air distribution passages or inlet passages 40,41 communicated with respective upstream chambers $a_1$ . . . and respective reed valve devices $L_1,L_2,L_3$ and $L_4,L_5,L_6$ L *through the plurality of communication ports 42 formed in the covers* $28_2,28_2$.

As will be seen from FIG. 3, the inlet passages 40,41 are composed of a substantially U-cross-sectional lower passage member 40d formed in the valve housing $28_1$ integral with the cylinder cover 23 and an inverted U-cross-sectioned passage member 40u formed in the valve cover $28_2$. As the valve cover $28_2$ is fixed onto the cylinder head cover 23, the upper passage member 40u is fixed to the lower passage member 40d through heat-resistant packing 29 thereby to form the aforementioned inlet passages 40,41. Therefore, the secondary air distribution passages or inlet passages 40,41 can be formed simultaneously with the formation of the cylinder head cover 23 and the valve cover $28_2$. Namely, it is not necessary to take the trouble of mechanical processing for the formation of these passages.

The secondary air distribution passage or inlet passages 40,41 are formed to have a diameter of, for example, about 20 mm, sufficiently large to reduce the flow resistance. The diameter is maintained constant over the entire length of these passages.

Since the secondary air distribution passages or inlet passages 40,41 are formed by means of the cylinder head cover 23 and the valve casings 28 of the reed valve devices $L_1$ to $L_6$, it is not necessary to expose to the outside of the engine the secondary air distribution passages constituting a part of the secondary air supply system. It is thus possible to simplify the construction by reducing the number of the parts. It is also possible to prevent the damaging of the secondary air distribution passages attributable to contact with foreign matter. The assembling of the exhaust gas cleaning system as a whole is very much simplified, because the secondary air distribution passages can be formed simply by placing the reed valve devices $L_1$ to $L_6$ on the cylinder head cover 23.

The outlet 45a of the downstream chamber $a_2$ of each reed valve device $L_1$ to $L_6$ is in communication with an outlet passage 45 formed in the cylinder head cover 23. The passage 45 is further connected through a connecting joint J to a secondary air supply passage 46 formed in the cylinder head 2. The secondary air supply passage 46 communicates with the exhaust port 6.

The aforementioned joint J includes a connecting member 49 having a cylindrical form and made of iron, coated with a heat and acid resistant film 50 of a dacro coating, known under tradename as DACRO MET 320 or the like. The joint J has an upper half of small diameter and a lower half of large diameter. The lower half of the connecting joint J is connected in an air tight manner to the open end of the secondary air supply passage 46 through an "O" ring 47, while the upper half is connected in an air tight manner to the open end of the secondary air supply passage 45 through an "O" ring 48.

The connecting joint J serves also as a guide member for the mounting of the head cover 23 on the cylinder head 2.

An engine r.p.m pick-up device R (FIG. 4) is provided in the valve cover $28_2$ which constitutes a part of the valve casing of the reed valve devices $L_1$ to $L_3$ and $L_4$ to $L_6$. The construction of the engine r.p.m. pick-up device will be explained hereinunder with reference to FIGS. 4 and 5. An engine r.p.m. pick-up hole 52 is formed in the portion of the valve cover $28_2$ between the reed valve devices $L_1,L_2$.

A driven shaft 51 extends into the cylinder head cover 23 through the pick-up hole 52. The driven shaft 51 is supported at its inner end by a bearing 53 (FIG. 5) formed in the cylinder head 2, while the outer end of the shaft is supported by a lid 54 covering the pick-up hole 52. An oil seal 55 is interposed between the driven shaft 51 and the lid 54. A tabular connecting portion 56 is formed integrally with the outer end of the driven shaft 51. A bifurcated connecting portion 58 of a flexible transmission cable 57 is detachably secured to the connecting portion 56. As will be seen from FIG. 1, the transmission cable 57 extends forwardly of the motorcycle Vh and is connected to a tachometer T provided on the steering bar. A driven gear 59 is formed integrally with the lower portion 51 of the driven shaft 51. The driven gear 59 meshes with a drive wheel 60 formed integrally with the cam shaft 15 at an intermediate portion of the latter. Therefore, as the cam shaft 15 is rotated through the crank shaft during operation of the engine E, the tachometer T is driven through a driven shaft 51 and a flexible transmission cable 57.

The operation of the described embodiment of the invention will be explained hereinunder.

As the engine E is started, pulsations of exhaust gas pressure are generated in respective exhaust ports 6. The pulsations are transmitted to the reed valves 33 through the secondary air supply passage 47 and the outlet passages 45 to open the reed valves 33. Then, as the air control valve V is opened, a part of the clean air in the air cleaner 8 is distributed to the two inlet passages 40,41 through the secondary air introduction tube 44 to reach the upstream chambers $a_1$ of respective valve casings 28 through the communication ports 42. The air then comes into the downstream chambers $a_2$ through the valve holes 35 of the reed valves 33 and is introduced into the exhaust ports 6 through the outlet passages 45 and the secondary air supply passages 46.

The secondary air introduced into the exhaust port 6 is mixed with the exhaust gas to oxidize the unburnt noxious components in the exhaust gas such as HC, CO and the like, within the exhaust port 6 and the exhaust pipe 9.

The exhaust gas mixed with the secondary air then flows into the muffler 10 and acts to promote the reaction of the catalytic converter 11 in the muffler 10 thereby to finally remove the unburnt noxious components before discharge to the atmosphere.

The rotation of the cam shaft 15 as a result of operation of the engine E is transmitted to the driven gear 51 through the driving and driven wheels 60,59. The driven shaft 51 in turn drives the tachometer T through the flexible transmission cable 57.

During the operation of the engine E, it is often experienced that the hot exhaust gas in each exhaust port flows back into the inlet passage 40,41 due to pulsation of the exhaust gas pressure. However, the inlet passages 40,41 disposed at the front side of the cylinder head cover 23 are effectively cooled by the natural draft generated as a result of running of the motorcycle, thereby to cool the hot exhaust gas coming back into these passages 40,41. In consequence, the deterioration due to heating of the constituents of the reed valve devices $L_1$ to $L_6$, as well as the secondary air introduction tube 44 consisting of a rubber tube connected to the reed valve device, is effectively avoided.

According to the invention, as shown by a chain line in FIG. 1, it is possible to separate the cylinder head cover 23 from the cylinder head 2 simply by separating the secondary air introduction tube 44. This considerably facilitates maintenance operations such as tappet clearance adjustment, change of the spark plugs P and so forth.

It is necessary to preserve a sufficiently large volume of the upstream chamber $a_1$ of each reed valve device $L_1$ to $L_6$, for otherwise a large pressure drop will occur in the upstream chamber $a_1$ in each sucking operation caused by the pulsation of the exhaust pressure, to undesirably increase the pressure loss, resulting in an increase of the suction resistance. In such a case, the secondary air may not be supplied at a rate large enough to cause the oxidation of the unburnt noxious components in the exhaust gas. This problem, however, is overcome in the exhaust gas cleaning system of the invention.

Namely, according to the invention, each reed valve device $L_1$ to $L_6$ is constituted by valve casing 28 including valve housing $28_1$ formed on the cylinder head cover 23 and valve cover $28_2$ fixed to the upper side of the valve housing $28_1$; and reed valve member 33 fitted in recess 39 formed in the valve housing $28_1$ and dividing the space in the valve box 28 into upstream chamber $a_1$ communicating with the atmosphere and downstream chamber $a_2$ communicating with the exhaust system; the cross-sectional area of the upstream chamber $a_1$ being selected to be greater than the planar projection area of the reed valve member 33. This arrangement provides a sufficiently large volume of the upstream chamber $a_1$ so that a sufficiently large amount of secondary air is sucked into the upstream chamber $a_1$ in each sucking action caused by the pulsation of the exhaust gas pressure, thereby to oxidize and remove the unburnt noxious components in the exhaust gas without fail.

In addition, the aforementioned arrangement permits the upstream chamber $a_1$ to have a reduced height while maintaining a sufficiently large volume. Therefore, it is possible to install the reed valve devices $L_1$ to $L_6$ without increasing the height of the engine E. This feature is quite advantageous particularly when the invention is applied to a vehicle having a restricted mounting space as in a motorcycle.

By preserving a sufficiently large space between the frame F of the motorcycle and the engine E, the maintenance of the spark plugs P is facilitated considerably, as well as the tappet clearance adjustment which is performed after removal of the cylinder head cover 23 as shown by a chain line in FIG. 1. It is also possible to lower the frame F to preserve a sufficiently large capacity of the fuel tank Ta and to cause the internal combustion engine F to approach, as much as possible, the centroid of the vehicle.

According to the invention, when applied to a motorcycle having a multi-cylinder engine with a multiplicity of cylinders arranged in series along an axis perpendicular to the longitudinal axis of the motocycle, a plurality of reed valve devices $L_1$ to $L_6$ are arranged in a side-by-side relation on the cylinder head cover 23 fixed to the cylinder head 2. At the same time, secondary air distribution passages or inlet passages 40,41 are disposed at the front side of the reed valve devices $L_1$ to $L_6$. The secondary air distribution passages or inlet passages 40,41 communicate at their upstream ends with the secondary air introduction tube 44 opening to the atmosphere and at their downstream ends with the upstream chambers $a_1$ of the plurality of reed valve devices $L_1$ to $L_6$. Furthermore, the downstream chambers $a_2$ of the reed valve devices $L_1$ to $L_6$ communicate with exhaust ports 6 leading to the plurality of cylinders $C_1$ to $C_6$, so that the secondary air distribution passages or inlet passages 40,41 are effectively cooled by the natural air flow generated during running of the motorcycle. Therefore, even if there is a back flow of the exhaust gas into the passages 40,41, the hot exhaust gas is effectively cooled as it flows through the secondary air passages, so that undesirable overheating of the reed valve devices $L_1$ to $L_6$ is effectively avoided. In consequence, the constituents of the reed valve devices having low resistance to heat, particularly the packings, are protected from heat to ensure a highly reliable operation of the reed valve devices for a long period of time.

The reed valve devices $L_1$ to $L_6$ are mounted on the cylinder head cover 22, and the inlets of the reed valve devices communicate with the atmosphere through the inlet passages 40,41 which are formed in directly the thick-walled portion of the cylinder head cover 23. Also, the outlets 45a of the reed valve devices $L_1$ to $L_6$ are connected to the exhaust ports 6 of the exhaust system through the outlet passages 45 formed in the same portion of the cylinder head cover 23. This eliminates necessity for the separate constructions for the inlet and outlet passages of the reed valve devices $L_1$ to $L_6$, so that the number of parts as a whole is reduced to realize a simple construciton, which in turn offers an easier assembly and lower cost of production.

The position, area, shape and so forth of the inlet passages 40,41 and outlet passages 45 in relation to the reed valve device can be made uniform because these passages are directly formed in the cylinder head cover 23. This in turn makes it possible to precisely control the supply of the secondary air by the reed valve devices. This feature is quite advantageous particularly when the invention is applied to an engine having a multiplicity of cylinders. In addition, since the inlet passages 40,41 and the outlet passage 45 of each reed valve device $L_1$ To $L_6$ can be formed precisely in each cylinder head cover 23, it is possible to obtain a uniform quality of the secondary air supply control for a plurality of engines.

Since the engine r.p.m. pick-up device R is provided in the reed valve cover $28_2$, it is not necessary to take the trouble of connecting the engine r.p.m. pick-up device to the cylinder head cover 23 nor to divide the reed valve cover 23. In consequence, the number of parts is reduced to permit simplification of construction. Since the engine r.p.m. pick-up device R can be assembled simultaneously with the assembling of the reed valve devices $L_1$ to $L_6$, the assembling of the reed valve devices is very much simplified to contribute to the reduction of the production cost.

In addition, by providing the engine r.p.m. pick-up device in the reed valve cover $28_2$ of the reed valve devices $L_1$ to $L_3$ above the exhaust valve cam shaft 15 located at the front of the engine block, the flexible transmission cable 57 for driving the tachometer T can be arranged in such a manner as not to extend across the space above the cylinder head cover 23, so that the maintenance work concerning the spark plugs and so forth can be conducted without interference from the flexible transmission cable 57 leading to the tachometer.

Incidentally, the cylinder head cover 23, in which are provided the reed valve devices $L_1$-$L_6$, is secured to the cylinder head 2 with the thick heat insulating elastic packing 22 interposed therebetween so that the cylinder head cover 23 is well heat-insulated from the cylinder head 2 which is subjected to a high temperature. As a result, the cylinder head cover 23 is effectively insulated to avoid excessive heating of the reed valve devices, thus protecting the component parts including, particularly, the packings 29 and 31 from heat deterioration.

FIG. 6 is graph showing results of heat-shielding tests using, for the heat insulating elastic packing 22, a heat insulating rubber seal having a thickness of 3 mm. In this graph, the abscissa represents the distance from the exhaust ports 6, and the ordinate represents temperature. It is seen from this graph that there was a temperature difference of about 45° C. between the opposite joint surfaces of the cylinder head 2 and of the cylinder head cover 23, thus showing that the heat insulating rubber seal has a high heat insulating capacity.

What is claimed is:

1. An exhaust gas cleaning system for a multi-cylinder internal combustion engine comprising a plurality of combustion chambers, an exhaust system having exhaust ports opening into respective combustion chambers, a secondary air supplying system communicating with said exhaust system for supplying secondary air to said exhaust system, and a plurality of reed valve means interposed in said secondary air supplying system and adapted to open or close in response to pulsations of exhaust gas developed in said exhaust system during engine operation for controlling supply of secondary air to said respective exhaust ports independently of each other, said secondary air supplying system including single common inlet passage means leading to the ambient atmosphere for feeding secondary air to said reed valve means and a plurality of outlet passage means connected to said exhaust ports, respectively, said reed valve means including reed valve members and upstream and downstream chambers formed at opposite sides of said reed valve members, respectively, said upstream chambers being formed independently of one another for connection to said common inlet passage means while said downstream chambers are formed independently of one another and communicate with said respective outlet passage means, and a cylinder head cover, said inlet passage means as well as at least part of said outlet passage means, said reed valve members, said upstream and downstream chambers all being in said cylinder head cover.

2. An exhaust gas cleaning system according to claim 1 wherein said engine is mounted on a vehicle frame of a two-wheeled motorcycle at a position between front and rear wheels and said cylinder head cover is fixed on the top of said engine with a large space being left below a portion of said vehicle frame running over the cylinder head cover.

3. An exhaust gas cleaning system according to claim 1 wherein said engine includes a cylinder head disposed on said cylinders, said plurality of cylinders being transversely mounted on a vehicle frame, said cylinder head cover being secured to said cylinder head and having a front position and a rear portion, said reed valve means being disposed on said cylinder head cover in aligned relation, said secondary air supplying system having its inlet passage means formed in the front portion of said cylinder head cover, said inlet passage means having an upstream end in communication with a secondary air introduction tube leading to the ambient atmosphere.

4. An exhaust gas cleaning system according to claim 1 wherein said plurality of cylinders are arranged in two rows and said exhaust ports are disposed in two rows at one and the same side of said cylinders, said reed valve means further comprising said reed valve members as formed in first and second rows each defining said upstream and downstream chambers at opposite sides thereof, said plurality of outlet passage means being formed in two rows for supplying secondary air from each row of said reed valve members to the associated row of said exhaust ports, said inlet passage means being formed on first and second passages arranged along one and the same side of said first and second rows of reed valve members, said first and second inlet passage being joined together at a location between said first and second rows of cylinders to connect with a secondary air introduction tube leading to the ambient atmosphere.

5. An exhaust gas cleaning system according to claim 1 wherein said engine comprises an engine body, a cylinder head and said cylinder head cover, and said reed valve means includes a valve housing on said cylinder head cover, said inlet passage means being defined by said cylinder head cover and said valve housing.

6. An exhaust gas cleaning system according to claim 1 wherein said engine comprises a cylinder head; said cylinder head cover being secured to said cylinder head; said reed valve means each comprising a valve housing including a housing body formed in said cylinder head cover and a cover member secured to said housing body, said reed valve member in said valve housing dividing the interior thereof into said upstream and downstream chambers; said upstream chamber having a cross-sectional area greater than that of said reed valve member.

7. An exhaust gas cleaning system according to claim 1 wherein said engine comprises a cylinder head; said cylinder head cover being secured to said cylinder head and having a thick portion; said inlet and outlet passage means of said secondary air supplying system being in said thick portion of said cylinder head cover.

8. An exhaust gas cleaning system according to claim 1 wherein said engine further comprises a valve cover secured to said cylinder head cover, said reed valve means being mounted between said cylinder head cover and said valve cover, and an engine r.p.m. pick-up means in said valve cover and operatively driven from said engine for transmitting engine speed to an external member.

9. An exhaust gas cleaning system according to claim 1 wherein said engine further comprises a cylinder head secured to said cylinder head cover, said outlet passage means of the secondary air supplying system each including a first passage provided by said cylinder head cover, a second passage in said cylinder head connected to said first passage and to said exhaust port, and connection means sealably mounted in said cylinder head cover and said cylinder head for connecting said first and second passages and for guidingly engaging said cylinder head cover on said cylinder head.

10. An exhaust gas cleaning system according to claim 3 or 6 wherein said engine is mounted on a vehicle frame of a motorcycle at a position between front and rear wheels and said cylinder head cover is fixed to the top of said engine with a large space being left below a portion of said vehicle frame running over the cylinder head cover.

11. An exhaust gas cleaning system for a multi-cylinder internal combustion engine of the type having a cylinder block; a cylinder head disposed on said cylinder block; an intake valve and an exhaust valve mounted in said cylinder head for each cylinder; a valve-operating cam mechanism disposed above said intake and exhaust valves for opening and closing said intake and exhaust valves, said cam mechanism including a cam shaft, a cam element mounted on said cam shaft, and a plurality of spaced bearings in said cylinder head each having a cam shaft holder fixedly secured thereto rotatably supporting said cam shaft; a cylinder head cover secured to said cylinder head for covering said cam shaft and said cam shaft holders; and a plurality of combustion chambers; said exhaust gas cleaning system comprising an exhaust system having exhaust ports opening into respective combustion chambers, a secondary air supplying system communicating with said exhaust system for supplying secondary air to said exhaust system, and a plurality of reed valve means interposed in said secondary air supplying system and mounted in said cylinder head cover so as to be located in spaces between adjacent cam shaft holders, said reed valve means being adapted to open or close in response to pulsations of exhaust gas developed in said exhaust system during engine operation for controlling supply of secondary air to said respective exhaust ports independently of each other.

12. In a multicylinder internal combustion engine having a cylinder block, a cylinder head on said block, a cylinder head cover secured to said cylinder head, a plurality of combustion chambers, intake and exhaust valves in said cylinder head controlling fluid flow to and from the combustion chambers, and an exhaust system having exhaust ports opening into respective combustion chambers, the improvement comprising an exhaust gas cleaning system including secondary air supplying means for supplying secondary air to the exhaust system of the engine, and a plurality of reed valve means each associated with a respective combustion chamber for respectively controlling supply of secondary air to a respective exhaust port of the associated combustion chamber independently of the other exhaust ports, said secondary air supplying means having an inlet passage means which consists of first and second passages for feeding secondary air to upstream chambers of said reed valve means and a plurality of outlet passage means formed independently of each other for each connecting a downstream chamber of said reed valve means and said exhaust port, said inlet passage means, at least part of said outlet passage means, and said upstream and downstream chambers of the reed valve means all being provided in said cylinder head cover.

13. The improvement as claimed in claim 12 wherein said engine further comprises cam means for operating said intake and exhaust valves, said cam means being covered by said cylinder head cover when the latter is secured to said cylinder head.

14. The improvement as claimed in claim 12 wherein said engine is adapted for being mounted on a vehicle frame with said cylinders thereof extending transversely of the direction of travel of the vehicle, said inlet passage means being located in said head cover for being cooled by air flow produced by forward travel of the vehicle.

15. The improvement as claimed in claim 12 wherein said cylinders are arrayed in two rows on opposite sides of a longitudinal center line extending through the engine, said first and second passages of the inlet passage means being adapted for respectively supplying secondary air to said two rows of cylinders, said secondary air supplying means further comprising a common conduit supplying secondary air to said first and second passages.

16. The improvement as claimed in claim 12 wherein said outlet passage means each includes a first passage provided by said cylinder head cover, a second passage in said cylinder head connected to said first passage and to said exhaust port of the respective combustion chamber, and connection means sealably mounted in said cylinder head cover and said cylinder head for connecting said first and second passages and for guidingly engaging said cylinder head cover on said cylinder head.

17. The improvement as claimed in claim 12 wherein each of said reed valve means comprises a reed valve member defining said upstream and downstream chambers at opposite sides thereof in said cylinder head cover which are positioned upstream and downstream of said reed valve member, respectively, said upstream chamber having a cross-sectional area greater than that of said reed valve member.

18. The improvement as claimed in claim 13 comprising engine speed sensing means connected to said cylinder head cover for being operatively engaged with said cam means with the cylinder head cover mounted on said cylinder head to provide an output drive indicative of engine speed.

* * * * *

UNITED STATES PATENT AND TRADEMARK OFFICE
CERTIFICATE OF CORRECTION

PATENT NO. : 4,727,717
DATED : March 1, 1988
INVENTOR(S) : Yasuo Ikenoya

It is certified that error appears in the above—identified patent and that said Letters Patent is hereby corrected as shown below:

Reference numeral 40 is inserted in Fig. 2 on the drawing, as shown in the attached corrected drawing.

Signed and Sealed this

Fourteenth Day of March, 1989

Attest:

DONALD J. QUIGG

*Attesting Officer*  *Commissioner of Patents and Trademarks*